(12) United States Patent
Tanaka et al.

(10) Patent No.: US 8,774,581 B2
(45) Date of Patent: Jul. 8, 2014

(54) HOLEY FIBER, AND LASER DEVICE USING THE SAME

(71) Applicant: Fujikura Ltd., Tokyo (JP)

(72) Inventors: Hironori Tanaka, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 2 days.

(21) Appl. No.: 13/623,243

(22) Filed: Sep. 20, 2012

(65) Prior Publication Data

US 2013/0016743 A1 Jan. 17, 2013

Related U.S. Application Data

(63) Continuation of application No. PCT/JP2011/055773, filed on Mar. 11, 2011.

(30) Foreign Application Priority Data

Mar. 20, 2010 (JP) ................. 2010-065311

(51) Int. Cl.
*G02B 6/032* (2006.01)
*G02B 6/02* (2006.01)

(52) U.S. Cl.
USPC .......................................... 385/125; 385/123

(58) Field of Classification Search
USPC ....................................................... 385/125
See application file for complete search history.

(56) References Cited

U.S. PATENT DOCUMENTS

2009/0169162 A1 * 7/2009 Kumkar et al. ............... 385/127

FOREIGN PATENT DOCUMENTS

| JP | 2005-070607 A | 3/2005 |
| JP | 2008-158096 A | 7/2008 |
| JP | 2008-171985 A | 7/2008 |
| JP | 2009-510500 A | 3/2009 |

OTHER PUBLICATIONS

International Search Report of PCT/JP2011/055773, mailing date May 17, 2011.

* cited by examiner

*Primary Examiner* — Uyen Chau N Le
*Assistant Examiner* — Kajli Prince
(74) *Attorney, Agent, or Firm* — Westerman, Hattori, Daniels & Adrian, LLP

(57) ABSTRACT

The invention aims to provide a holey fiber that can release leak light propagating through the clad at a desired location, and a laser device using the holey fiber. A holey fiber includes: one end and the other end; a core; an inner clad coating the core; a hole layer having a large number of holes formed therein and coating the inner clad; and an outer clad coating the hole layer. In this holey fiber, a collapse region is formed, and the holes in the collapse region are squashed by a predetermined length in the length direction of the fiber.

12 Claims, 9 Drawing Sheets

HOLEY FIBER, AND LASER DEVICE USING THE SAME

TECHNICAL FIELD

The invention relates to a holey fiber and a laser device using the holey fiber, and more particularly, to a holey fiber that can release leak light propagating through the clad at a desired location, and a laser device using the holey fiber.

BACKGROUND ART

Fiber laser devices are used in the fields of processing machinery, medical equipment, measurement instruments, and the like, and light that is amplified by amplification optical fibers is output from the fiber laser devices. In such a fiber laser device, there are cases where light that is output from the core of the amplification optical fiber is input to the core of a delivery fiber, and propagates through the delivery fiber. After reaching a desired location, the light is output.

However, at the connecting portion between the amplification optical fiber and the delivery fiber, part of the light that is output from the amplification optical fiber might leak into the clad of the delivery fiber and propagate through the clad of the delivery fiber, due to axis misalignment between the cores, angle mismatch between the cores, a mode field difference between the cores, or the like. In that case, the leak light propagating through the clad is absorbed by the coating layer of the delivery fiber, and the coating layer might burn out.

Patent Document 1 listed below discloses an optical component that releases, from an optical fiber, leak light propagating through such a clad. In this optical component, the optical fiber is inserted into a glass tube that has a small inner diameter at one end and has a large inner diameter at the other end. The inner wall of the glass tube at the one end is welded to the clad of the optical fiber, and the inner wall of the glass tube at the other end is separated from the optical fiber. Leak light leaking into the clad of the optical fiber propagates from the clad to the glass tube at the welded portion at the one end of the glass tube, and the light that is input to the glass tube is released to the outside from the other end of the glass tube.

CITATION LIST

Patent Document

[Patent Document 1] Japanese Patent Application Laid-Open No. 2008-158096

SUMMARY OF THE INVENTION

Objects to be Achieved by the Invention

In the optical component disclosed in Patent Document 1 listed above, however, leak light needs to be released before being absorbed by the coating layer of the optical fiber or the like. Therefore, the optical component needs to be located in the vicinity of the end portion of the optical fiber, and the installation position is limited.

In view of the above, the invention aims to provide a holey fiber that can release leak light propagating through the clad at a desired location, and a laser device using the holey fiber.

Means for Achieving the Objects

A holey fiber of the invention includes: one end and the other end; a core; an inner clad coating the core; a hole layer having a large number of holes formed therein and coating the inner clad; and an outer clad coating the hole layer. In this holey fiber, a collapse region is formed, and the holes in the collapse region are squashed by a predetermined length in the length direction of the fiber.

In such a holey fiber, even when part of light that is input to the core and light that is output from the core leaks as leak light into the inner clad, the leak light is confined in the inner clad and propagates through the inner clad, since the inner clad is coated with the hole layer. Accordingly, release of leak light from the holey fiber at an unintended location can be prevented. Thus, in a case where the holey fiber is coated with the coating layer, burnout of the coating layer can be prevented. In the collapse region, the holes of the hole layer are squashed, so that leak light propagates from the inner clad toward the outer clad via the hole layer, and is released to the outside of the holey fiber. By providing the collapse region at a desired location, leak light propagating through the inner clad can be released at the desired location.

In the above described holey fiber, the holes are preferably squashed to reduce the diameters thereof in the collapse region.

Leak light that is input to the inner clad contains components with higher numerical apertures (NAs) and components with lower NAs. In such a holey fiber, the mean refractive index of the hole layer can be adjusted by reducing the diameters of the holes. Accordingly, the NA of light that can propagate through the inner clad can be adjusted in the collapse region. Thus, the components of leak light having higher NAs than the NA of light that can propagate through the inner clad can be released in the collapse region. In this manner, the amount of leak light to be released can be adjusted.

Alternatively, in the above described holey fiber, the holes are preferably completely squashed in the collapse region.

In such a holey fiber, the holes are completely squashed in the collapse region. Accordingly, the amount of leak light to be released can be maximized.

In the collapse region in the above described holey fiber, the holes are preferably squashed in such a manner that the diameters thereof become gradually smaller in the direction from the one end toward the other end.

In the collapse region in such a holey fiber, the mean refractive index of the hole layer gradually increases in the direction from the one end of the holey fiber toward the other end, and the NA of light that can propagate through the inner clad becomes gradually lower in that direction. Accordingly, as the mean refractive index of the hole layer increases in the collapse region, leak light propagating through the inner clad from the one end to the other end is gradually released, the highest-NA component of the leak light being the first to be released, the lowest-NA component of the leak light being the last. Thus, the leak light to be released does not locally concentrate, but can be dispersed in the length direction of the fiber.

In the collapse region in the above described holey fiber, the holes are preferably squashed in such a manner that the diameters thereof become smaller in a stepwise fashion in the direction from the one end toward the other end.

In the collapse region in such a holey fiber, the mean refractive index of the hole layer increases in a stepwise fashion in the direction from the one end of the holey fiber toward the other end, and the NA of light that can propagate through the inner clad becomes lower in a stepwise fashion in that direction. Accordingly, as the mean refractive index of the hole layer increases in the collapse region, leak light propagating through the inner clad from the one end to the other end is released in a stepwise fashion, the highest-NA component of the leak light being the first to be released, the lowest-NA component of the leak light being the last. In such a holey fiber, the leak light to be released does not locally concentrate either, but can be dispersed in the length direction of the fiber.

Further, in the above described holey fiber, the holes are preferably completely squashed in the portion adjacent to the portion in which the holes have the smallest diameters.

In the collapse region in such a holey fiber, the holes are squashed in such a manner that the diameters thereof decrease gradually or in a stepwise fashion, and are completely squashed in the end. Accordingly, the leak light that has not been released in the portions in which the holes are not completely squashed can be released.

In the above described holey fiber, collapse regions are preferably provided, each of the collapse regions being the same as the above described collapse region. The holes are preferably squashed to reduce the diameters thereof in a stepwise fashion in the direction from the collapse region closest to the one end toward the collapse region closest to the other end.

In the collapse regions in such a holey fiber, the mean refractive index of the hole layer in the collapse regions becomes higher in a stepwise fashion in the direction from the one end of the holey fiber toward the other end. Accordingly, the NA of light that can propagate through the inner clad becomes lower in a stepwise fashion in the collapse regions. Thus, leak light propagating through the inner clad from the one end to the other end is released in a stepwise fashion in the collapse regions, the highest-NA component of the leak light being the first to be released. With such a holey fiber, leak light is released from the respective collapse regions in a stepwise fashion. Accordingly, the leak light to be released does not locally concentrate, and can be dispersed in the length direction of the fiber.

Further, in the above described holey fiber, the holes are preferably completely squashed in the collapse region closest to the other end.

With such a holey fiber, the leak light that has not been released in the portions in which the holes are not completely squashed can be released.

In the above described holey fiber, collapse regions are preferably provided, each of the collapse regions being the same as the above described collapse region. The lengths of the collapse regions increase in a stepwise fashion in the direction from the collapse region closest to the one end toward the collapse region closest to the other end.

In the respective collapse regions in such a holey fiber, the release of leak light becomes easier in the direction from the one end of the holey fiber toward the other end. Accordingly, leak light propagating through the inner clad from the one end to the other end is released in a stepwise fashion in the collapse regions. With such a holey fiber, leak light is released from the collapse regions in a stepwise fashion. Accordingly, the leak light to be released does not locally concentrate, and can be dispersed in the length direction of the fiber.

In the above described holey fiber, the one end is preferably the input end through which light is input to the core.

In such a holey fiber, when light is input to the one end of the holey fiber, part of the input light might leak from the core and propagate through the clad from the one end of the holey fiber toward the other end. Even in such a case, the leak light can be released in the collapse region. Particularly, in a case where leak light propagating from the one end toward the other end is gradually released or is released in a stepwise fashion, the leak light to be released does not locally concentrate, and can be dispersed in the length direction of the fiber.

Alternatively, in the holey fiber, the one end is preferably the output end through which light is output from the core.

In such a holey fiber, when light is output from the one end of the holey fiber, part of the output light might be reflected, and the reflected light might propagate as leak light through the clad from the one end of the holey fiber toward the other end. Even in such a case, the leak light can be released in the collapse region. Particularly, in a case where leak light propagating from the one end toward the other end is gradually released or is released in a stepwise fashion, the leak light to be released does not locally concentrate, and can be dispersed in the length direction of the fiber.

In the collapse region in the above described holey fiber, at least part of the outer clad is preferably coated with a light releasing member having a refractive index equal to or higher than the refractive index of the outer clad.

With such a holey fiber, propagation of leak light from the outer clad to the light releasing member can be facilitated, and the leak light can be efficiently released.

Further, in the above described holey fiber, the light releasing member is preferably connected to a heat converting member.

With such a holey fiber, leak light that has reached the light releasing member can be absorbed by the heat converting member and can be converted into light. Accordingly, unnecessary release of leak light into open space can be restrained.

A laser device of the invention includes the above described holey fiber, and output light propagates through the holey fiber.

With such a laser device, output light can propagate through the holey fiber, and leak light can be released at a desired location, even in a case where the leak light is generated and propagates through the clad of the holey fiber.

The above described laser device preferably further includes an optical fiber including a core and a clad, the optical fiber being end-connected to the holey fiber, the optical fiber inputting the output light to the core of the holey fiber. In this laser device, the outer diameter of the clad is preferably equal to or smaller than the outer diameter of the inner clad.

With such a laser device, leak light can be easily confined in the inner clad of the holey fiber even in a case where the unnecessary leak light is generated in the optical fiber connected to the holey fiber and is output from the clad of the optical fiber. When the optical fiber and the holey fiber are end-connected to each other, foam generation from the holes in the holey fiber can be restrained.

Effect of the Invention

As described above, the invention provides a holey fiber that can release leak light propagating through the clad at a desired location, and a laser device using the holey fiber.

EMBODIMENTS OF THE INVENTION

Preferred embodiments of holey fibers and laser devices using the holey fibers according to the invention will be described in detail below with reference to the accompanying drawings.

(First Embodiment)

Figure 1:
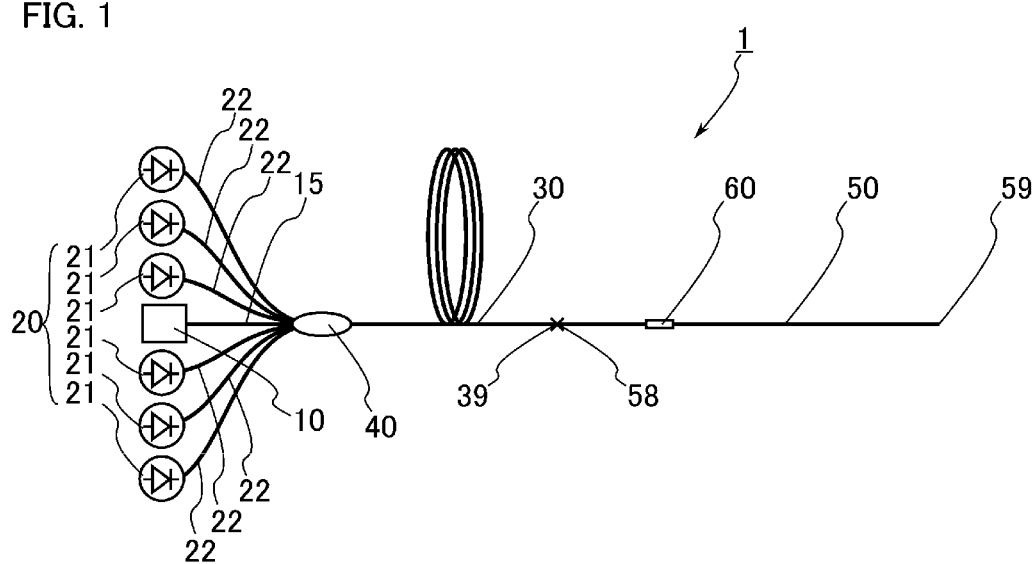
FIG. 1 is a diagram showing a laser device according to a first embodiment of the invention.

FIG. 1 is a diagram showing a laser device according to a first embodiment of the invention.

As shown in FIG. 1, a laser device 1 is a fiber laser device that includes as main components: a seed light source 10 that outputs seed light; a pumping light source 20 that outputs pumping light; an amplification optical fiber 30 to which the seed light and the pumping light are input; a combiner 40 that connects the seed light source 10 and the pumping light source 20 to the amplification optical fiber 30; and a holey fiber 50 as a delivery fiber having one end connected to the amplification optical fiber 30.

The seed light source 10 is formed with a laser light source including a laser diode, or with a fiber laser device of a Fabry-Perot type or a fiber ring type, for example. The seed light output from the seed light source 10 is not particularly limited, but may be laser light with a wavelength of 1070 nm, for example. The seed light source 10 is connected to a seed light propagation fiber 15 formed with a core and a clad coating the core. The seed light output from the seed light source 10 propagates through the core of the seed light propagation fiber 15. The seed light propagation fiber 15 may be a single-mode fiber, for example. In that case, the seed light propagates as single-mode light through the seed light propagation fiber 15.

The pumping light source 20 is formed with laser diodes 21. In a case where the wavelength of the seed light is 1070 nm as described above, the pumping light source 20 outputs pumping light with a wavelength of 915 nm, for example. The respective laser diodes 21 of the pumping light source 20 are connected to pumping light propagation fibers 22, and the pumping light output from the laser diodes 21 propagates through the pumping light propagation fibers 22. The pumping light propagation fibers 22 may be multi-mode fibers, for example. In that case, the pumping light propagates as multi-mode light through the pumping light propagation fibers 22.

Figure 2:
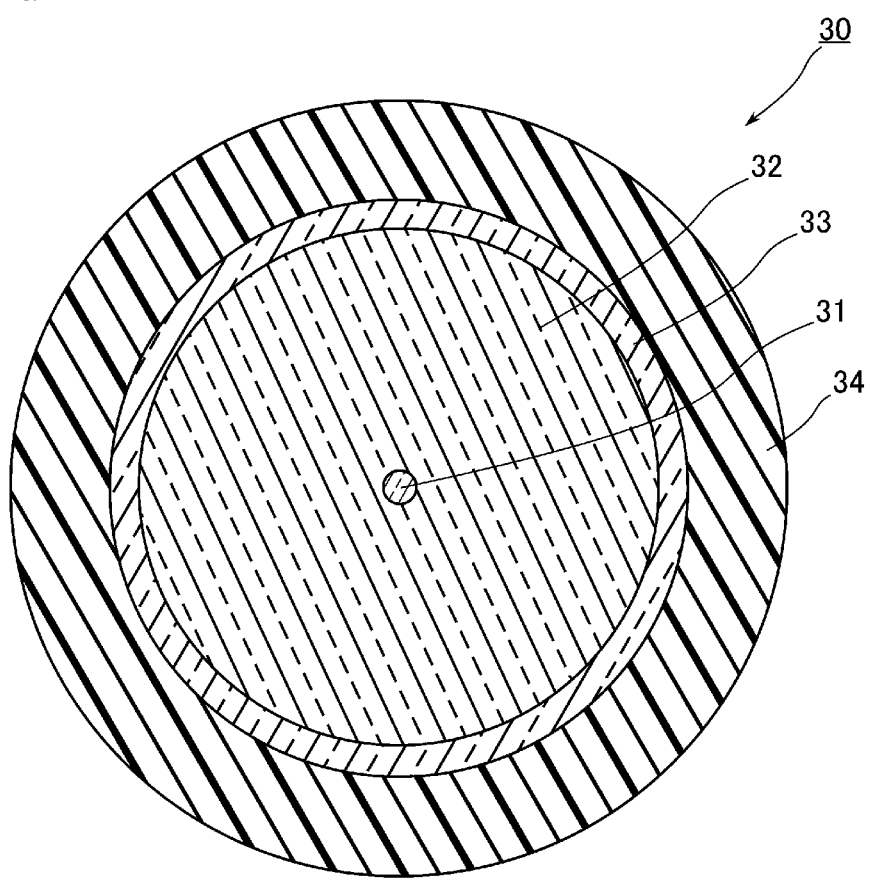
FIG. 2 is a diagram showing a cross-sectional view of the amplification optical fiber of FIG. 1, taken along a line perpendicular to the length direction thereof.

FIG. 2 is a diagram showing a cross-sectional view of the amplification optical fiber 30, taken along a line perpendicular to the longitudinal direction thereof. As shown in FIG. 2, the amplification optical fiber 30 includes a core 31, a clad 32 coating the core 31, a plastic clad 33 coating the clad 32, and a coating layer 34 coating the plastic clad 33. The refractive index of the clad 32 is lower than the refractive index of the core 31, and the refractive index of the plastic clad 33 is even lower than the refractive index of the clad 32. The diameter of the core 31 is 15 µm, for example, and the outer diameter of the clad 32 is 400 µm, for example. The material forming the core 31 may be silica doped with an element such as germanium, which increases the refractive index, or with an active element such as ytterbium (Yb), which is pumped by the pumping light output from the pumping light source 20, for example. Such an active element may be a rare-earth element, and the rare-earth element may be thulium (Tm), cerium (Ce), neodymium (Nd), europium (Eu), or the like, other than the above mentioned Yb. Other than the rare-earth element, the active element may be bismuth (Bi), chromium (Cr), or the like. The material forming the clad 32 may be pure silica not doped with any dopant, for example. The material forming the plastic clad 33 may be an ultraviolet curable resin, for example, and the material forming the coating layer 34 may be an ultraviolet curable resin different from the resin forming the plastic clad 33, for example.

The combiner 40 connects the seed light propagation fiber 15 and the respective pumping light propagation fibers 22 to the amplification optical fiber 30. Specifically, at the combiner 40, the core of the seed light propagation fiber 15 is end-connected to the core 31 of the amplification optical fiber 30. Further, at the combiner 40, the core of each of the pumping light propagation fibers 22 is end-connected to the clad 32 at one end of the amplification optical fiber 30. Accordingly, the seed light output from the seed light source 10 is input to the core 31 of the amplification optical fiber 30, and the pumping light output from the pumping light source 20 is input to the clad 32 of the amplification optical fiber 30.

Figure 3:
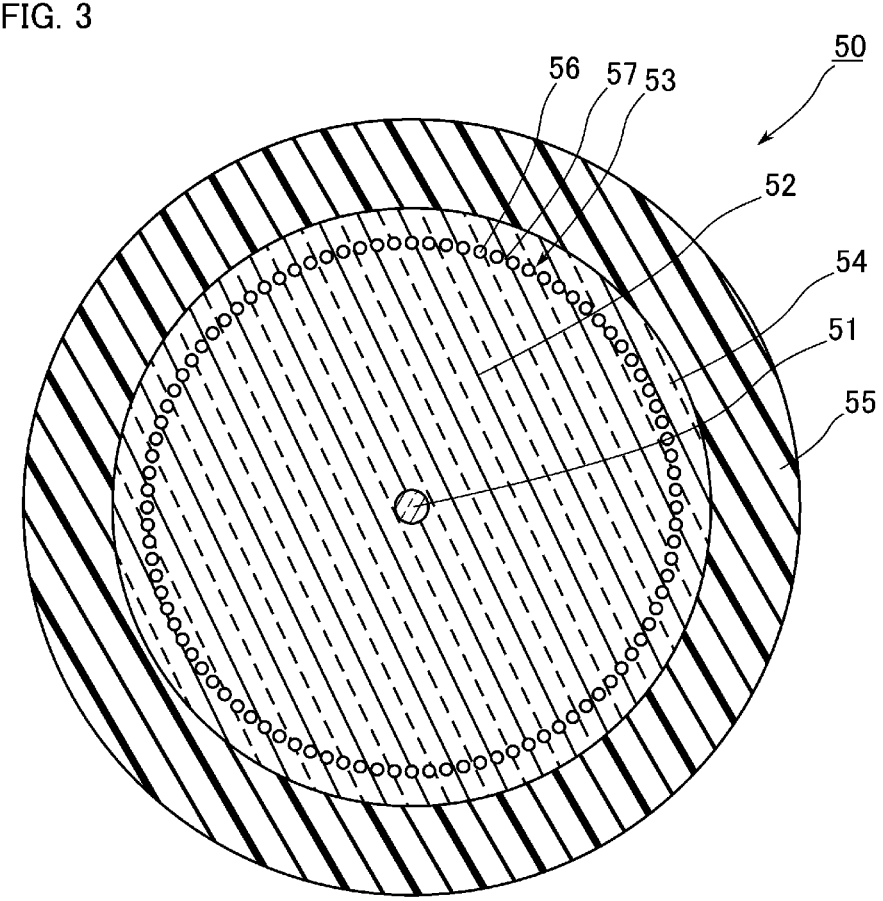
FIG. 3 is a diagram showing a cross-sectional view of the holey fiber of FIG. 1, taken along a line perpendicular to the length direction thereof.

FIG. 3 is a diagram showing a cross-sectional view of the holey fiber 50 of FIG. 1, taken along a line perpendicular to the length direction thereof. As shown in FIG. 3, the holey fiber 50 includes a core 51, an inner clad 52 coating the core 51, a hole layer 53 coating the inner clad 52, an outer clad 54 coating the hole layer 53, and a coating layer 55 coating the outer clad 54. The diameter of the core 31 is 15 µm, for example, and the outer diameter of the inner clad 52 is 400 µm, for example. In the hole layer 53, a large number of holes 56 are formed to coat the inner clad 52, and a rib 57 is formed between each two adjacent holes 56. The diameter of each of the holes 56 is 6.8 µm, for example, and the shortest distance between the holes 56 (or the smallest width of each of the ribs 57) is 1.2 µm, for example. The inner clad 52, the ribs 57, and the outer clad 54 are made of the same material having a lower refractive index than the core 51. The material forming the core 51 may be silica doped with an element such as germanium, which increases the refractive index, for example, and the material forming the inner clad 52, the ribs 57, and the outer clad 54 may be pure silica not doped with any dopant, for example. The material forming the coating layer 55 may be an ultraviolet curable resin, for example.

Figure 4:
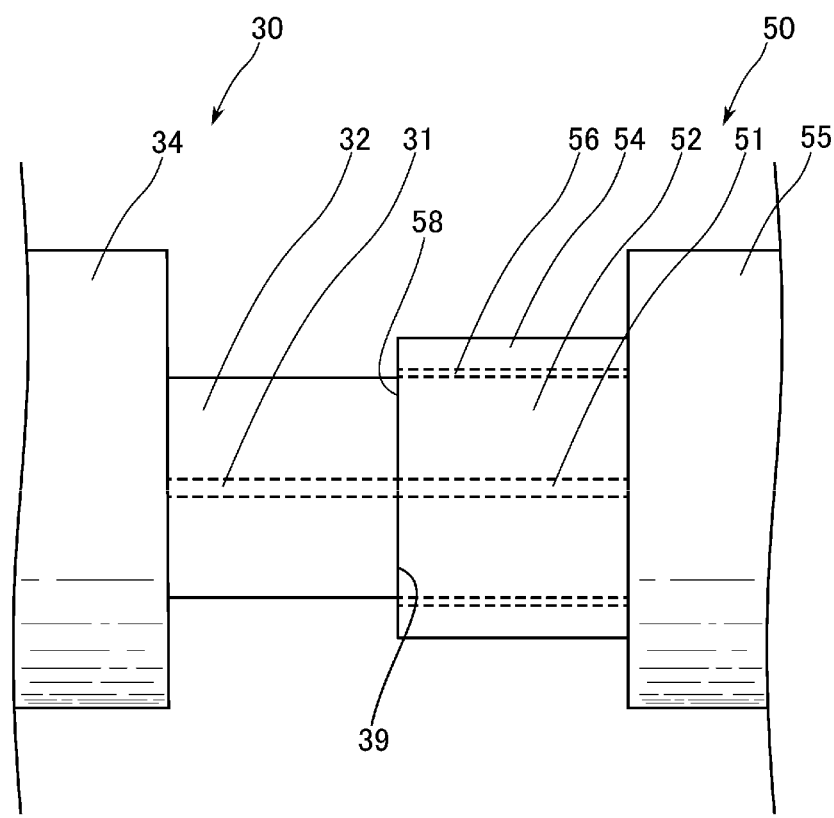
FIG. 4 is a diagram showing the connection between the amplification optical fiber and the holey fiber.

As shown in FIG. 1, one end 58 of the holey fiber 50 is connected to the amplification optical fiber 30 as described above, and the other end 59 is not connected to anything and is a free end. FIG. 4 is a diagram showing the connection between the amplification optical fiber 30 and the holey fiber

50. For ease of comprehension, the scales for the respective components constituting the amplification optical fiber 30 and the holey fiber 50 in FIG. 4 differ from those in FIGS. 2 and 3. As shown in FIG. 4, the coating layer 55 is removed from the holey fiber 50 in the portion near the one end 58. The plastic clad 33 and the coating layer 34 are removed from the amplification optical fiber 30 in the portion near the other end 39. The one end 58 of the holey fiber 50 is end-connected to the other end 39 of the amplification optical fiber 30, the core 51 of the holey fiber 50 is connected to the core 31 of the amplification optical fiber 30, and the inner clad 52 of the holey fiber 50 is connected to the clad 32 of the amplification optical fiber 30. In a case where the amplification optical fiber 30 that inputs output light to the holey fiber 50 is end-connected to the holey fiber 50 as in this embodiment, the outer diameter of the clad 32 of the amplification optical fiber 30 is preferably equal to or smaller than the outer diameter of the inner clad 52 of the holey fiber 50. In this structure, when the amplification optical fiber 30 and the holey fiber 50 are end-connected to each other, foam generation from the holes in the holey fiber can be restrained.

Figure 5:
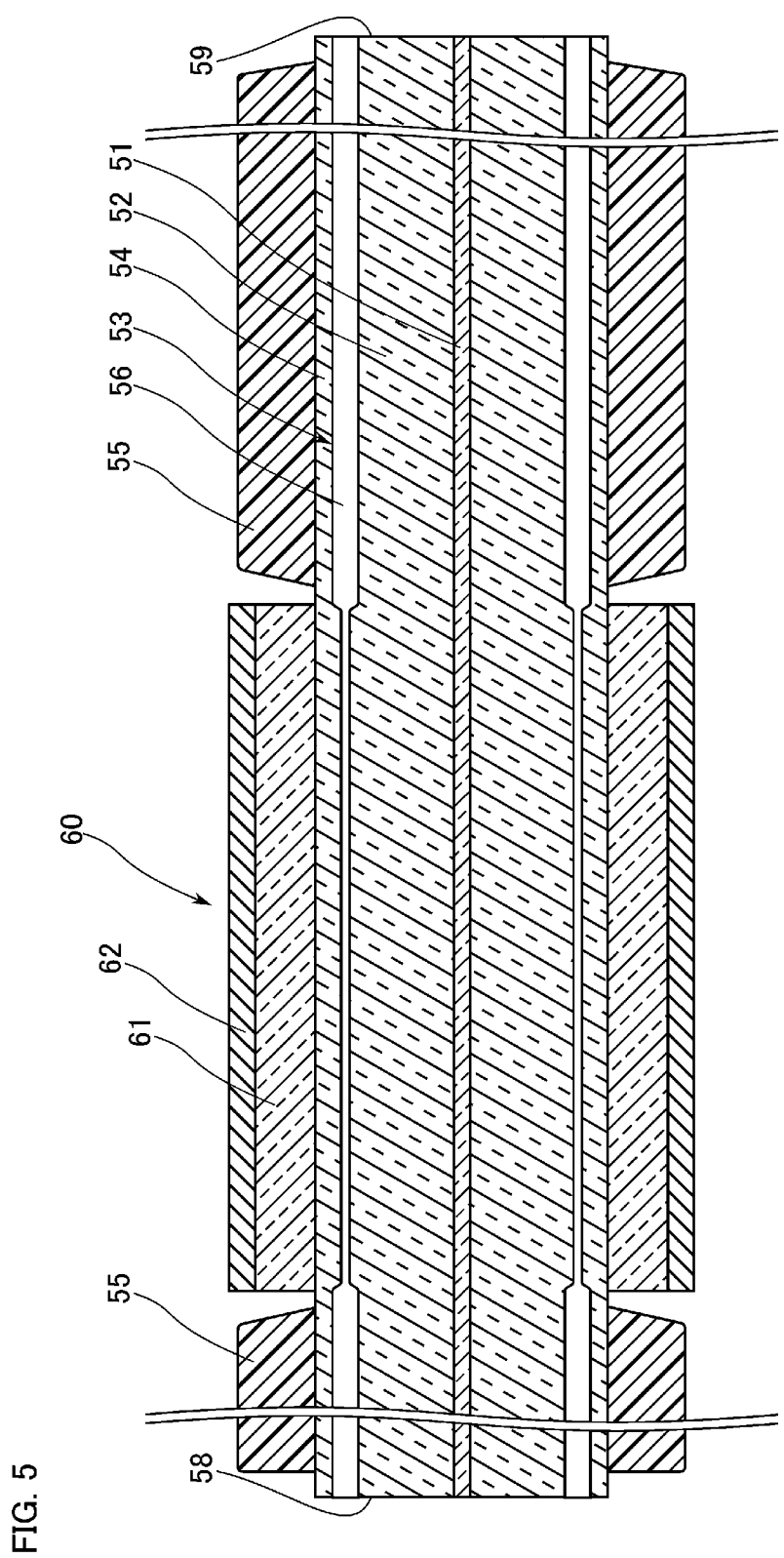
FIG. 5 is a diagram showing a cross-sectional view of the collapse region extending in the length direction of the holey fiber of FIG. 1.

In the holey fiber 50, a collapse region 60 shown in FIG. 1 is formed. FIG. 5 is a diagram showing a cross-sectional view of the collapse region extending in the length direction of the holey fiber shown in FIG. 1. For ease of comprehension, the scales for the respective components constituting the holey fiber 50 in FIG. 5 differ from those in FIG. 3, and the amplification optical fiber 30 is not shown. In the collapse region 60 and its surrounding regions, the coating layer 55 is removed as shown in FIG. 5. In the collapse region 60, each of the holes 56 is squashed in such a manner that the diameter thereof becomes smaller, and the width of the rib 57 formed between each two adjacent holes 56 becomes greater. Accordingly, in the collapse region 60, the mean refractive index of the hole layer 53 is higher, and the NA of light that can propagate through the inner clad 52 is lower than in the other regions of the holey fiber 50. Therefore, in the collapse region 60, part of light that can propagate through the inner clad 52 in regions other than the collapse region of the holey fiber 50 cannot propagate through the inner clad 52, and propagates to the outer clad 54 via the hole layer 53.

The diameter of each of the holes 56 in the collapse region 60 is 0 to 80% of the diameter of each of the holes 56 in the regions other than the collapse region 60. Particularly, the diameters of the holes 56 in the collapse region 60 are preferably such that the NA of the inner clad 52 becomes equal to or lower than the NA of the core 51, because the NA of light leaking from the core 31 of the amplification optical fiber 30 into the inner clad 52 of the delivery fiber 50 is often higher than the NA of the core 51, and a sufficiently large effect can be achieved through the minimum necessary number of procedures. The length of the collapse region 60 is 100 mm, for example.

Such a collapse region can be formed by removing the coating layer 55 of the holey fiber 50, and pressing the holes 56 by heating at least part of the region from which the coating layer 55 has been removed. At this point, the pressing of the holes can be adjusted by controlling the heating temperature and the heating time. In the heating, a CO2 laser, oxyhydrogen flame, or electrical discharge machining can be used.

At least part of the outer peripheral surface of the outer clad 54 in the collapse region 60 is coated with a light releasing member 61, and the light releasing member 61 is connected to a heat converting member 62. The light releasing member 61 is made of a material having a refractive index equal to or higher than the refractive index of the outer clad 54. Such a material may be a high-refractive-index silicon resin, for example. The heat converting member 62 is not particularly limited, as long as it is made of a material that can convert light into heat. However, a material that excels in heat release characteristics is preferable, and the heat converting member 62 may be made of a metal such as stainless steel, for example.

Next, operations of the laser device 1 are described.

First, seed light is output from the seed light source 10, and pumping light is output from the pumping light source 20. The seed light output from the seed light source 10 at this point has a wavelength of 1080 nm as described above, for example. The seed light output from the seed light source 10 propagates through the core of the seed light propagation fiber 15, and is input to the combiner 40.

Meanwhile, the pumping light output from each of the laser diodes 21 of the pumping light source 20 has a wavelength of 915 nm as described above, for example. The pumping light output from the respective laser diodes 21 propagates through the pumping light propagation fibers 22, and is input to the combiner 40.

The seed light that is input to the combiner 40 in the above manner is then input to the core 31 of the amplification optical fiber 30, and propagates through the core 31. Meanwhile, the pumping light that is input to the combiner 40 is then input to the clad 32 of the amplification optical fiber 30, and propagates mainly through the clad 32.

When the pumping light passes through the core 31, the pumping light is absorbed by the active element with which the core 31 is doped, and the active element is pumped. The pumped active element then causes stimulated emission, and the seed light is amplified by the stimulated emission and is output as output light from the other end 39 of the amplification optical fiber 30.

The output light that is output from the core 31 of the amplification optical fiber 30 is input to the core 51 of the holey fiber 50, propagates through the core 51, and is output from the other end 59 of the holey fiber 50.

At this point, there are times when part of the output light that is output from the amplification optical fiber 30 is input as leak light to the inner clad 52 of the holey fiber 50, due to axis misalignment between the cores, angle mismatch between the cores, a mode field difference between the cores at the connecting portion between the amplification optical fiber 30 and the holey fiber 50. Since the inner clad 52 is coated with the hole layer 53, the leak light that is input to the inner clad 52 is confined in the inner clad 52 and propagates therethrough. The leak light propagating through the inner clad 52 reaches the collapse region 60. The leak light that is input to the inner clad 52 contains high-NA components as well as low-NA components. However, the NA of light that can propagate through the inner clad 52 in the collapse region 60 is lower than the NA of light that can propagate through the inner clad 52 in the regions other than the collapse region 60 as described above. Therefore, of the leak light, the components having higher NAs than the NA of light that can propagate through the inner clad 52 reach the outer clad 54 via the hole layer 53. The leak light that has reached the outer clad 54 is released from the light releasing member 61, and is converted into heat by the heat converting member 62. In this manner, the leak light vanishes.

As described above, in the laser device 1 according to this embodiment, even if part of the output light that is input to the core 51 in the holey fiber 50 leaks as leak light into the inner clad 52, the leak light is confined in the inner clad 52 and propagates through the inner clad 52, since the inner clad 52 is coated with the hole layer 53. Accordingly, release of leak light from a portion unintended by the user in the holey fiber 50 can be prevented. Accordingly, in the case where the holey fiber 50 is coated with the coating layer 55, burnout of the coating layer 55 can be prevented. As the holes 56 in the hole layer 53 are squashed in the collapse region 60, leak light propagates from the inner clad 52 toward the outer clad 54 via the hole layer 53, and is released to the outside of the holey fiber 50. With the collapse region 60 provided at a desired location, the leak light propagating through the inner clad 52 can be released at the desired location.

The holes 56 are squashed in such a manner that the diameters become smaller in the collapse region 60. Accordingly, by reducing the diameters of the holes 56, the mean refractive index of the hole layer 53 can be arbitrarily adjusted. In this holey fiber 50, the NA of light that can propagate through the inner clad 52 can be adjusted in the collapse region 60. Accordingly, the components of leak light having higher NAs than the NA of light that can propagate through the inner clad 52 can be released in the collapse region 60. In this manner, the amount of leak light to be released can be adjusted.

Further, by providing the light releasing member 61 in the collapse region 60, propagation of leak light from the outer clad 54 to the light releasing member 61 is facilitated, and the leak light can be efficiently released. By connecting the heat converting member 62 to the light releasing member 61, the leak light that has reached the light releasing member 61 is absorbed by the heat converting member 62 and is converted into heat. Accordingly, unnecessary release of leak light into open space can be restrained.

Further, in this embodiment, the outer diameter of the clad 32 of the amplification optical fiber 30 end-connected to one end of the holey fiber 50 is equal to or smaller than the outer diameter of the inner clad 52 of the holey fiber 50. Accordingly, leak light can be easily confined in the inner clad 52 of the holey fiber 50.

Further, in this embodiment, even if part of the pumping light that is input to the amplification optical fiber 30 is not absorbed by the amplification optical fiber 30 but propagates through the clad 32 and is output from the other end 39 of the amplification optical fiber 30, the output pumping light can be input to the inner clad 52 of the holey fiber 50. In that case, the pumping light that is input to the inner clad 52 propagates through the inner clad 52 together with leak light, and is released from the collapse region 60. In this embodiment, the outer diameter of the clad 32 of the amplification optical fiber 30 end-connected to one end of the holey fiber 50 is equal to or smaller than the outer diameter of the inner clad 52 of the holey fiber 50. Accordingly, the pumping light that is output from the amplification optical fiber 30 can be efficiently input to the inner clad 52 of the holey fiber 50.

(Second Embodiment)

Figure 6:
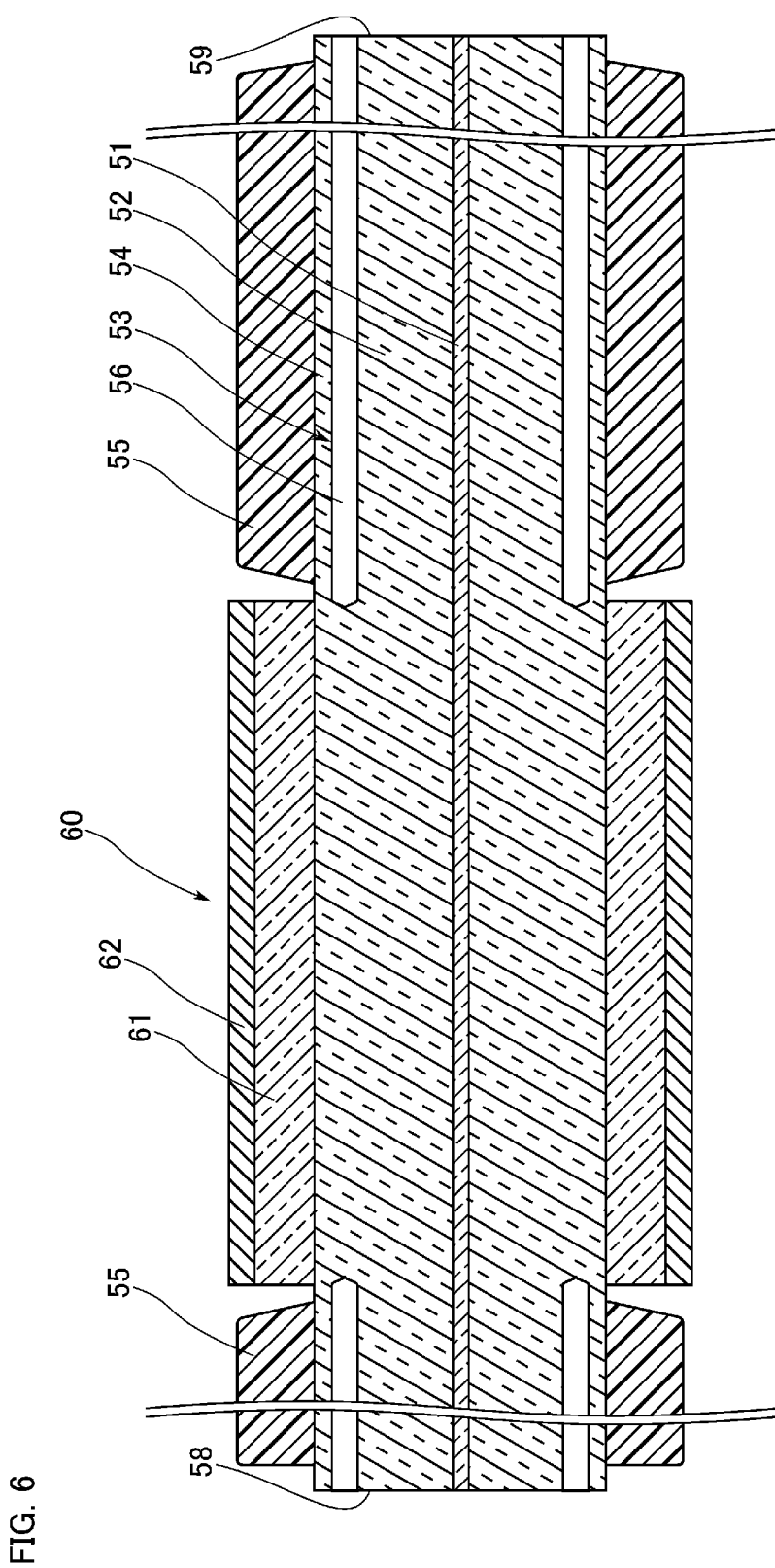
FIG. 6 is a diagram showing a cross-sectional view of the collapse region extending in the length direction of the holey fiber of a laser device according to a second embodiment of the invention.

Referring now to FIG. 6, a second embodiment of the invention is described in detail. It should be noted that components that are identical or similar to those in the first embodiment are denoted by the same reference numerals as those used in the first embodiment, and the same explanation will not be repeated. FIG. 6 is a diagram showing a cross-sectional view of a collapse region 60 extending in the length direction of a holey fiber 50 in a laser device according to the second embodiment of the invention. For ease of comprehension, the scales for the respective components constituting the holey fiber 50 in FIG. 6 also differ from those in FIG. 3, and the amplification optical fiber 30 is not shown.

As shown in FIG. 6, the laser device of this embodiment differs from the laser device 1 of the first embodiment in that holes 56 are completely squashed in the collapse region 60 formed on the holey fiber 50. Accordingly, all the ribs 57 shown in FIG. 1 are connected in the portion in which the holes 56 are completely squashed.

In the laser device 1 according to this embodiment, the holes 56 are completely squashed in the collapse region 60 of the holey fiber 50. Accordingly, the amount of leak light to be released can be maximized, even though the mechanism for confining leak light in the inner clad does not exist.

(Third Embodiment)

Figure 7:
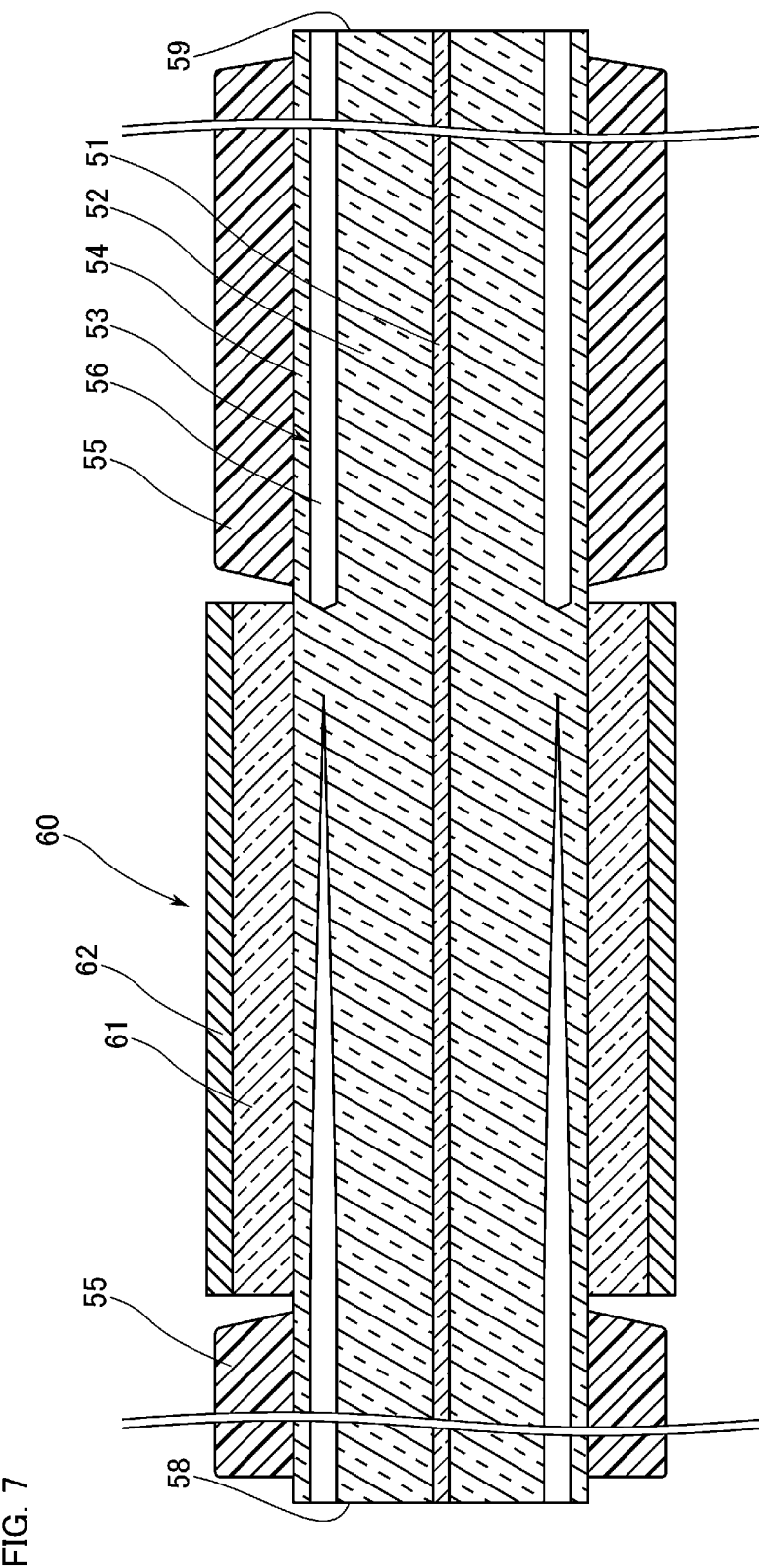
FIG. 7 is a diagram showing a cross-sectional view of the collapse region extending in the length direction of the holey fiber of a laser device according to a third embodiment of the invention.

Referring now to FIG. 7, a third embodiment of the invention is described in detail. It should be noted that components that are identical or similar to those in the first embodiment are denoted by the same reference numerals as those used in the first embodiment, and the same explanation will not be repeated. FIG. 7 is a diagram showing a cross-sectional view of a collapse region 60 extending in the length direction of a holey fiber 50 in a laser device according to the third embodiment of the invention. For ease of comprehension, the scales for the respective components constituting the holey fiber 50 in FIG. 7 also differ from those in FIG. 3, and the amplification optical fiber 30 is not shown.

As shown in FIG. 7, the laser device of this embodiment differs from the laser device 1 of the first embodiment in that, in the collapse region 60 formed on the holey fiber 50, holes 56 are squashed in such a manner that the diameters become gradually smaller in the direction from one end 58 of the holey fiber 50 toward the other end 59. That is, in the collapse region 60, the diameters of the holes 56 are made gradually smaller by tilting the inner walls of the holes 56 with respect to the longitudinal direction of the holey fiber 50. Accordingly, in the collapse region 60, the widths of the ribs 57 shown in FIG. 3 are gradually increased, and the mean refractive index of the hole layer 53 is gradually increased in the direction from the one end 58 of the holey fiber 50 toward the other end 59. Thus, in the collapse region 60, the NA of light that can propagate through the inner clad 52 is gradually lowered in the direction from the one end 58 of the holey fiber 50 toward the other end 59. In the portion adjacent to the portion in which the holes 56 have the smallest diameters, the holes 56 are completely squashed.

In the laser device according to this embodiment, the mean refractive index of the hole layer 53 becomes gradually higher in the collapse region 60. Therefore, leak light that propagates through the inner clad 52 from the one end 58 of the holey fiber 50 toward the other end 59 is gradually released, the highest-NA component of the leak light being the first to be released, the lowest-NA component being the last. Accordingly, the leak light to be released does not locally concentrate, but can be dispersed in the length direction of the fiber.

(Fourth Embodiment)

Figure 8:
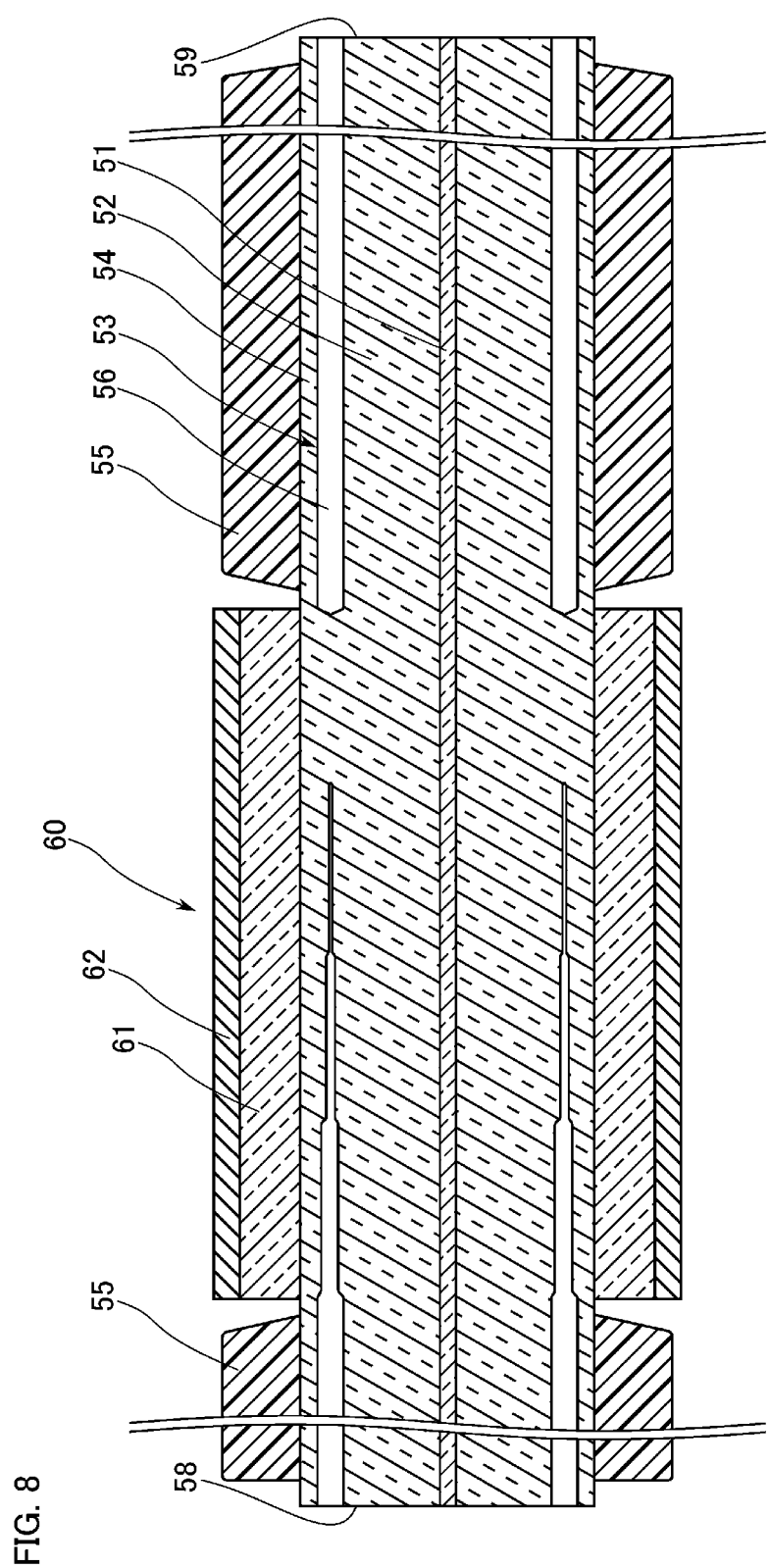
FIG. 8 is a diagram showing a cross-sectional view of the collapse region extending in the length direction of the holey fiber of a laser device according to a fourth embodiment of the invention.

Referring now to FIG. 8, a fourth embodiment of the invention is described in detail. It should be noted that components that are identical or similar to those in the first embodiment are denoted by the same reference numerals as those used in the first embodiment, and the same explanation will not be repeated. FIG. 8 is a diagram showing a cross-sectional view of a collapse region extending in the length direction of a holey fiber in a laser device according to the fourth embodiment of the invention. For ease of comprehension, the scales for the respective components constituting the holey fiber 50 in FIG. 8 also differ from those in FIG. 3, and the amplification optical fiber 30 is not shown.

As shown in FIG. 8, the laser device of this embodiment differs from the laser device 1 of the first embodiment in that, in the collapse region 60 formed on the holey fiber 50, holes 56 are squashed in such a manner that the diameters become smaller in a stepwise fashion in the direction from one end 58 of the holey fiber 50 toward the other end 59. That is, in the collapse region 60, the widths of the ribs 57 shown in FIG. 3 are increased in a stepwise fashion, and the mean refractive index of the hole layer 53 is increased in a stepwise fashion in the direction from the one end 58 of the holey fiber 50 toward the other end 59. Accordingly, in the collapse region 60, the NA of light that can propagate through the inner clad 52 is lowered in a stepwise fashion in the direction from the one end 58 of the holey fiber 50 toward the other end 59. In the portion adjacent to the portion in which the holes 56 have the smallest diameters, the holes 56 are completely squashed.

In the laser device according to this embodiment, the mean refractive index of the hole layer 53 becomes higher in a stepwise fashion in the collapse region 60. Therefore, leak light that propagates through the inner clad 52 from the one end 58 of the holey fiber 50 toward the other end 59 is released in a stepwise fashion, the highest-NA component of the leak light being the first to be released, the lowest-NA component being the last. Accordingly, the leak light to be released does not locally concentrate, but can be dispersed in the length direction of the fiber.

(Fifth Embodiment)

Figure 9:
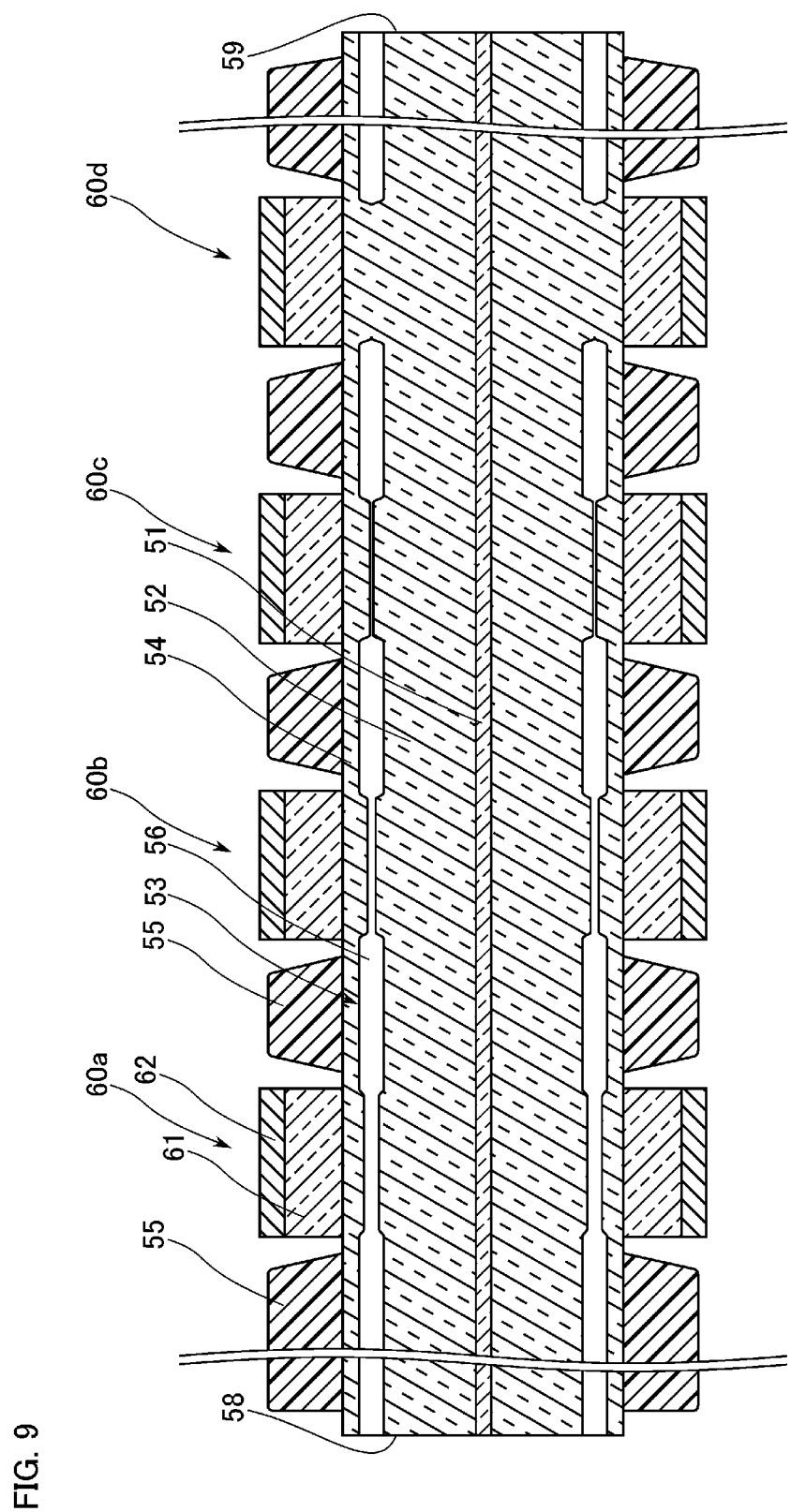
FIG. 9 is a diagram showing a cross-sectional view of the collapse regions extending in the length direction of the holey fiber of a laser device according to a fifth embodiment of the invention.

Referring now to FIG. 9, a fifth embodiment of the invention is described in detail. It should be noted that components that are identical or similar to those in the first embodiment are denoted by the same reference numerals as those used in the first embodiment, and the same explanation will not be repeated. FIG. 9 is a diagram showing a cross-sectional view of collapse regions extending in the length direction of a holey fiber in a laser device according to the fifth embodiment of the invention. For ease of comprehension, the scales for the respective components constituting the holey fiber 50 in FIG. 9 also differ from those in FIG. 3, and the amplification optical fiber 30 is not shown.

As shown in FIG. 9, the laser device of this embodiment differs from the laser device 1 of the first embodiment in that collapse regions 60a through 60d are formed on the holey fiber 50, and holes 56 are squashed in such a manner that the diameters become smaller in a stepwise fashion in the direction from the collapse region 60a closest to one end 58 of the holey fiber 50 toward the collapse region 60d closest to the other end 59. The holes 56 are completely squashed in the collapse region 60d closest to the other end 59 of the holey fiber 50. That is, the widths of the ribs 57 in the collapse regions 60a through 60d are increased in a stepwise fashion in the direction from the collapse region 60a toward the collapse region 60d, and the mean refractive index of the hole layer 53 is increased in a stepwise fashion. Accordingly, in the collapse regions 60a through 60d, the NA of light that can propagate through the inner clad 52 is lowered in a stepwise fashion in the direction from the collapse region 60a toward the collapse region 60d. In this embodiment, the collapse regions 60a through 60d have the same lengths as one another.

In the collapse regions 60a through 60d, at least part of the outer peripheral surface of the outer clad 54 is coated with a light releasing member 61, and the light releasing member 61 is connected to a heat converting member 62, as in the collapse region 60 of the first embodiment.

In the laser device according to this embodiment, the release of leak light in the collapse regions 60a through 60d becomes easier in the direction from the one end 58 of the holey fiber 50 toward the other end 59, the highest-NA component of the leak light being the first to be released. Accordingly, the leak light propagating through the inner clad 52 from the one end 58 of the holey fiber 50 toward the other end 59 is released in a stepwise fashion in the collapse regions 60a through 60d. With this holey fiber 50, leak light is released from the collapse regions 60a through 60d in a stepwise fashion. Thus, the leak light to be released does not locally concentrate, and can be dispersed in the length direction of the fiber.

Furthermore, in the collapse region 60d closest to the other end, the holes 56 are completely squashed. Accordingly, the leak light that has not been released in the collapse regions 60a through 60c in which the holes 56 are not completely squashed can be released.

(Sixth Embodiment)

Figure 10:
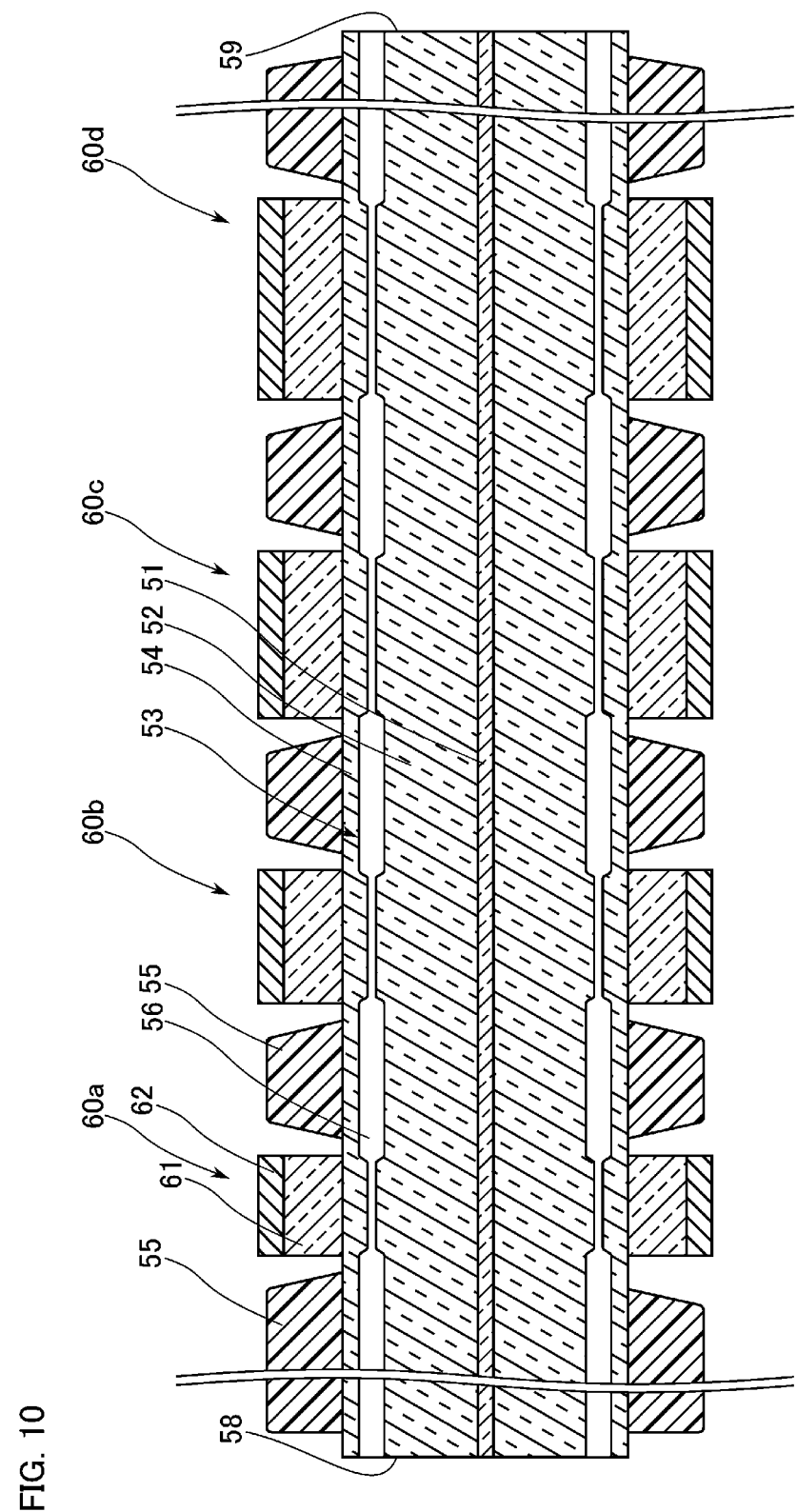
FIG. 10 is a diagram showing a cross-sectional view of the collapse regions extending in the length direction of the holey fiber of a laser device according to a sixth embodiment of the invention.

Referring now to FIG. 10, a sixth embodiment of the invention is described in detail. It should be noted that components that are identical or similar to those in the first embodiment are denoted by the same reference numerals as those used in the first embodiment, and the same explanation will not be repeated. FIG. 10 is a diagram showing a cross-sectional view of a collapse region extending in the length direction of a holey fiber in a laser device according to the sixth embodiment of the invention. For ease of comprehension, the scales for the respective components constituting the holey fiber 50 in FIG. 10 also differ from those in FIG. 3, and the amplification optical fiber 30 is not shown.

As shown in FIG. 10, the laser device of this embodiment differs from the laser device 1 of the first embodiment in that collapse regions 60a through 60d are formed on the holey fiber 50, and the collapse regions 60a through 60d become longer in a stepwise fashion in the direction from the collapse region 60a closest to one end 58 of the holey fiber 50 toward the collapse region 60d closest to the other end 59. In this embodiment, holes 56 are squashed in such a manner that the diameters are the same in the respective collapse regions 60a through 60d.

In the collapse regions 60a through 60d, at least part of the outer peripheral surface of the outer clad 54 is coated with a light releasing member 61, and the light releasing member 61 is connected to a heat converting member 62, as in the collapse region 60 of the first embodiment.

In the laser device according to this embodiment, the release of leak light in the collapse regions 60a through 60d of the holey fiber 50 becomes easier in the direction from the one end 58 of the holey fiber 50 toward the other end 59. Accordingly, the leak light propagating through the inner clad 52 from the one end 58 toward the other end 59 is released in a stepwise fashion in the collapse regions 60a through 60d. With this holey fiber 50, leak light is released from the collapse regions 60a through 60d in a stepwise fashion. Thus, the leak light to be released does not locally concentrate, and can be dispersed in the length direction of the fiber.

Although the first through sixth embodiments of the invention have been described so far by way of examples, the invention is not limited to those embodiments.

For example, in the first through sixth embodiments, the laser devices are fiber laser devices. However, the invention is not limited to them, and the holey fiber 50 may be used as the delivery fiber of a solid-state laser device.

In the laser devices described in the first through sixth embodiments, the holey fiber 50 is used as the output light delivery fiber. However, the holey fiber 50 may not necessarily be the output light delivery fiber, and is preferably used as an optical fiber particularly for high-power light propagation.

In the first through sixth embodiments, the one end 58 of the holey fiber is the output light input end, and the other end 59 is the output light output end. However, the invention is not limited to that. The other end 59 of the holey fiber may be the output light input end, and the one end 58 may be the output light output end. In that case, even when output light to be output from the one end 58 is partially reflected by the end surface and partially propagates as leak light through the inner clad 52 from the one end 58 toward the other end 59, the leak light can be released in the collapse region. This arrangement is preferable particularly in a case where the one end 58 serves as the output light output end in the third through sixth embodiments, because leak light that is generated as reflected output light and propagates through the inner clad 52 can be released gradually or in a stepwise fashion.

In the first through sixth embodiments, the coating layer 55 may not necessarily be provided, and further, the light releasing member 61 and the heat converting member 62 may not necessarily be provided. In that case, at least part of leak light propagating from the inner clad toward the outer clad in the collapse region is also released from the collapse region to the outside of the holey fiber.

In the second and third embodiments, the holes 56 are completely squashed in the portion adjacent to the portion in which the holes 56 have the smallest diameters. However, the portion in which the holes 56 are completely squashed may not necessarily be formed. Likewise, in the fifth embodiment, the holes 56 in the collapse region 60d do not need to be completely squashed, as long as the diameters are smaller than the diameters of the holes 56 in the collapse region 60c.

Further, in the fifth embodiment, the lengths of the collapse regions 60a through 60d may be increased in a stepwise fashion as in the sixth embodiment.

In the collapse regions 60a through 60d in the sixth embodiment, the holes 56 may be completely squashed as in the second embodiment, or the holes 56 may be gradually squashed as in the third embodiment, or the holes 56 may be squashed in a stepwise fashion as in the fourth embodiment.

In the above described embodiments, the outer diameter of the clad 32 of the amplification optical fiber 30 connected to the one end 58 of the holey fiber 50 is equal to or smaller than that of the inner clad 52 of the holey fiber 50. However, the invention is not limited to that, and the outer diameter of the clad of the optical fiber connected to the holey fiber 50 may be larger than the outer diameter of the inner clad 52 of the holey fiber 50.

EXAMPLES

In the following, the invention will be described in greater detail through examples and comparative examples, but the invention is not limited to them.

Example 1

The holey fiber shown in FIG. 3 was prepared. In this holey fiber, the diameter of the core was 15 μm, the outer diameter of the inner clad was about 400 μm, the hole layer had 157 holes of 6.8 μm, the outer diameter of the outer clad was 500 μm, and the outer clad was coated with a coating layer. A double-clad fiber for outputting output light was also prepared. In this double-clad fiber, the core had the same diameter as that of the holey fiber, the outer diameter of the clad was 400 μm, the clad was coated with a plastic clad, and the plastic clad was further coated with a coating layer.

The coating layer was removed from the portion near one end of the holey fiber, and the coating layer was removed from the portion near the output end of the double-clad fiber. The one end of the holey fiber and the output end of the double-clad fiber were end-connected to each other, so that the cores of the holey fiber and the double-clad fiber were joined to each other.

The coating layer was then removed by a length of 110 mm from a region that was 50 cm away from the one end of the holey fiber. In the region from which the coating layer had been removed, a 100-mm long portion of the holey fiber was heated with a CO2 laser until the holes vanished, to form a collapse region. The outer clad in the collapse region was then coated with a high-refractive-index silicon resin, and the outer clad was bonded and secured, by using the silicon resin, to stainless steel that had V-shaped grooves formed therein and was connected to a heat sink. With this arrangement, the silicon resin served as the light releasing member, and the stainless steel served as the heat converting member.

Output light was then output from the output end of the double-clad fiber so that 50 W leak light was generated from the connecting portion between the double-clad fiber and the holey fiber. The temperature of the coating layer of the holey fiber at this point was about 60 degrees centigrade.

Example 2

A holey fiber and a double-clad fiber that were the same as those of Example 1 were prepared, and the holey fiber and the double-clad fiber were connected in the same manner as in Example 1.

The coating layer of the holey fiber was then removed from 10 regions that were 50 cm away from one end of the holey fiber. Each removal length was the same as that in Example 1, and the intervals of removal were 5 cm. In the regions from which the coating layer had been removed, collapse regions of the same length as that in Example 1 were formed in the same manner as in Example 1. When the respective collapse regions were formed, however, the heating of the holey fiber was adjusted, so that the squashing force applied to the holes were increased in the direction from the collapse region closest to the one end of the holey fiber (or closest to the portion connected to the double-clad fiber) toward the collapse region closest to the other end, and the diameters of the holes were reduced in a stepwise fashion. In each of the collapse regions, the outer clad was coated with a light releasing member connected to a heat converting member in the same manner as in Example 1.

Output light was then output from the double-clad fiber so that 50 W leak light was generated from the connecting portion between the double-clad fiber and the holey fiber. The temperature of the coating layer of the holey fiber at this point was about 60 degrees centigrade.

Example 3

A holey fiber and a double-clad fiber that were the same as those of Example 1 were prepared, and the holey fiber and the double-clad fiber were connected in the same manner as in Example 1.

The coating layer was removed from 10 regions in the same manner as in Example 2. In the regions from which the coating layer had been removed, the holey fiber was heated in the same manner as in Example 1 until the holes were completely squashed as in Example 1, to form collapse regions. However, the lengths of the respective collapse regions were 10 mm, 20 mm, 30 mm, 40 mm, 50 mm, 60 mm, 70 mm, 80 mm, 90 mm, and 100 mm in this order in the direction from the collapse region closest to the one end of the holey fiber. In each of the collapse regions, the outer clad was coated with a light releasing member connected to a heat converting member in the same manner as in Example 1.

Output light was then output from the double-clad fiber so that 50 W leak light was generated from the connecting portion between the double-clad fiber and the holey fiber. The temperature of the coating layer of the holey fiber at this point was about 60 degrees centigrade.

Example 4

An amplification optical fiber having seed light input to one end thereof was prepared. In this amplification optical fiber, the diameter of the core was 15 μm, the diameter of the clad was 400 μm, the clad was coated with a plastic clad, and the plastic clad was coated with a coating layer. A holey fiber was also prepared. In the holey fiber, the diameter of the core was 15 μm, the outer diameter of the inner clad was about 80 μm, the hole layer had 31 holes of 6.9 μm, and the outer diameter of the outer clad was 140 μm. Further, six multi-mode fibers were prepared as pumping light propagation fibers each having a core of 105 μm in diameter.

The coating layer was then removed from the portion near the other end (the output end) of the amplification optical fiber, and the coating layer was removed from the portion near one end of the holey fiber. The one end of the holey fiber and the output end of the amplification optical fiber were end-connected to each other, so that the core of the holey fiber was joined to the core of the amplification optical fiber. The six multi-mode fibers were located around the holey fiber, and one end of each of the multi-mode fibers was end-connected to the output end of the amplification optical fiber, so that the cores of the multi-mode fibers were joined to the clad of the amplification optical fiber.

In this manner, a counter-propagating fiber laser device in which output light from the amplification optical fiber was input to the holey fiber, and pumping light was input to the output end of the amplification optical fiber was manufactured.

The coating layer was then removed from a region that was 50 cm away from the one end of the holey fiber as in Example 1. In the region from which the coating layer had been removed, a collapse region of the same length as that in Example 1 was formed in the same manner as in Example 1. When the collapse region was formed, however, the heating of the holey fiber was adjusted, so that the squashing force applied to the holes were gradually increased in the direction from the portion closest to the one end of the holey fiber in the collapse region (or closest to the portion connected to the amplification optical fiber) toward the portion closest to the other end, and the diameters of the holes were gradually reduced. In the portion closest to the other end in the collapse region, the holes were completely squashed. In the collapse region, the outer clad was coated with a light releasing member connected to a heat converting member in the same manner as in Example 1.

Seed light was then input to the one end of the amplification optical fiber, pumping light was input to each of the multi-mode fibers, and output light generated by amplifying the seed light was output from the amplification optical fiber. The intensity of the pumping light at this point was adjusted, and the output light was output from the amplification optical fiber so that 50 W leak light was generated from the connecting portion between the amplification optical fiber and the holey fiber. The temperature of the coating layer of the holey fiber at this point was about 60 degrees centigrade.

In Examples 1 through 4, an excessive temperature increase was not observed in the coating layer of any of the holey fibers. Accordingly, it can be considered that leak light propagating through the clad is hardly absorbed by the coating layer, and is released from the collapse region(s) provided at a desired location.

Industrial Applicability

The invention provides a holey fiber that can release leak light propagating through the clad at a desired location, and a laser device using the holey fiber.

Description of Reference Numerals

1 . . . laser device
10 . . . seed light source
15 . . . seed light propagation fiber
20 . . . pumping light source
21 . . . laser diodes
22 . . . pumping light propagation fibers
30 . . . amplification optical fiber
31 . . . core
32 . . . clad
33 . . . plastic clad
34 . . . coating layer
40 . . . combiner
50 . . . holey fiber
51 . . . core
52 . . . inner clad
53 . . . hole layer
54 . . . outer clad
55 . . . coating layer
56 . . . holes
57 . . . ribs
60, 60a, 60b, 60c, 60d . . . collapse region
61 . . . light releasing member
62 . . . heat converting member

The invention claimed is:

1. A holey fiber comprising:
   one end and the other end; a core; an inner clad coating the core; a hole layer having a large number of holes formed therein and coating the inner clad; and an outer clad coating the hole layer,
   wherein a collapse region is formed, the holes in the collapse region being squashed by a predetermined length in a length direction of the fiber, and
   wherein, in the collapse region, the holes are squashed to reduce diameters thereof in a stepwise fashion in a direction from the one end toward the other end.

2. The holey fiber according to claim 1, wherein
   the holes are completely squashed in a region in the collapse region.

3. The holey fiber according to claim 1, wherein
   the holes are completely squashed in a portion adjacent to a portion in which the holes have the smallest diameters.

4. The holey fiber according to claim 1, wherein
   the one end is an input end through which light is input to the core.

5. The holey fiber according to claim 1, wherein
   the one end is an output end through which light is output from the core.

6. The holey fiber according to claim 1, wherein,
   in the collapse region, at least part of the outer clad is coated with a light releasing member having a refractive index equal to or higher than a refractive index of the outer clad.

7. The holey fiber according to claim 6, wherein
   the light releasing member is connected to a heat converting member.

8. A holey fiber comprising:
   one end and the other end; a core; an inner clad coating the core; a hole layer having a large number of holes formed therein and coating the inner clad; and an outer clad coating the hole layer, wherein a collapse region is formed, the holes in the collapse region being squashed by a predetermined length in a length direction of the fiber,
wherein a plurality of collapse regions are provided, each of the collapse regions being the collapse region, and
the holes are squashed to reduce diameters thereof in a stepwise fashion in a direction from the collapse region closest to the one end toward the collapse region closest to the other end.

9. The holey fiber according to claim 8, wherein
the holes are completely squashed in the collapse region closest to the other end.

10. A holey fiber comprising:
one end and the other end; a core; an inner clad coating the core; a hole layer having a large number of holes formed therein and coating the inner clad; and an outer clad coating the hole layer,
wherein a collapse region is formed, the holes in the collapse region being squashed by a predetermined length in a length direction of the fiber,
wherein a plurality of collapse regions are provided, each of the collapse regions being the collapse region, and
lengths of the collapse regions increase in a stepwise fashion in a direction from the collapse region closest to the one end toward the collapse region closest to the other end.

11. A laser device comprising
the holey fiber according to any one of claims 1, 2 and 3 to 7,
wherein output light propagates through the holey fiber.

12. The laser device according to claim 11, further comprising
an optical fiber including a core and a clad, the optical fiber being end-connected to the holey fiber, the optical fiber inputting the output light to the core of the holey fiber,
wherein an outer diameter of the clad is equal to or smaller than an outer diameter of the inner clad.

* * * * *